United States Patent
Garrard et al.

(10) Patent No.: US 8,573,173 B2
(45) Date of Patent: Nov. 5, 2013

(54) FOUR STROKE SINGLE CYLINDER COMBUSTION ENGINE STARTING SYSTEM

(75) Inventors: Mike R Garrard, Chelmsford (GB); Deepak C Kashyap, Bangalore (IN); Satish R Madanagopal, Bangalore (IN)

(73) Assignee: Freescale Semiconductor, Inc., Austin, TX (US)

( * ) Notice: Subject to any disclaimer, the term of this patent is extended or adjusted under 35 U.S.C. 154(b) by 987 days.

(21) Appl. No.: 12/620,582

(22) Filed: Nov. 17, 2009

(65) Prior Publication Data
US 2011/0114049 A1    May 19, 2011

(51) Int. Cl.
*F02N 11/08* (2006.01)

(52) U.S. Cl.
USPC ...................................... 123/179.3

(58) Field of Classification Search
USPC .......................................... 123/179.3, 179.4
See application file for complete search history.

(56) References Cited

U.S. PATENT DOCUMENTS

| | | | | |
|---|---|---|---|---|
| 4,720,638 A * | 1/1988 | Vollbrecht | | 290/38 R |
| 5,101,780 A * | 4/1992 | Jones | | 123/182.1 |
| 5,458,098 A * | 10/1995 | Yagi et al. | | 123/179.3 |
| 5,687,682 A * | 11/1997 | Rembold et al. | | 123/179.3 |
| 5,713,320 A * | 2/1998 | Pfaff et al. | | 123/179.3 |
| 6,018,198 A * | 1/2000 | Tsuzuki et al. | | 290/17 |
| 6,453,864 B1 * | 9/2002 | Downs et al. | | 123/179.3 |
| 6,799,547 B2 * | 10/2004 | Sieber | | 123/179.5 |
| 6,877,470 B2 * | 4/2005 | Mitani et al. | | 123/179.3 |
| 7,079,939 B2 * | 7/2006 | Kataoka et al. | | 701/112 |
| 7,140,339 B1 * | 11/2006 | Smith | | 123/179.3 |
| 7,263,959 B2 * | 9/2007 | Kataoka et al. | | 123/179.4 |
| 7,410,445 B2 * | 8/2008 | Surewaard et al. | | 477/22 |
| 7,891,330 B2 * | 2/2011 | Kishibata et al. | | 123/179.3 |
| 2004/0226530 A1 * | 11/2004 | Kojima | | 123/179.3 |
| 2006/0048734 A1 * | 3/2006 | Kataoka et al. | | 123/179.4 |
| 2007/0227470 A1 * | 10/2007 | Cole et al. | | 123/3 |

FOREIGN PATENT DOCUMENTS

| | | |
|---|---|---|
| EP | 1657420 A1 | 5/2006 |
| EP | 1659279 A1 | 5/2006 |
| JP | 60602553 A | 3/1994 |
| WO | 0148373 A1 | 7/2001 |

* cited by examiner

*Primary Examiner* — Stephen K Cronin
*Assistant Examiner* — Arnold Castro
(74) *Attorney, Agent, or Firm* — Charles Bergere

(57) ABSTRACT

A four stroke single cylinder combustion engine starting system with an electrical machine is operable as both a generator and a motor. The starting system has a single cylinder four stroke combustion engine. A piston of the engine is coupled to a shaft of the electrical machine. The starting system also has a motor driver having outputs coupled to the electrical machine. A controller is coupled to the driver and an ignition switch is coupled to the controller. In response to the controller receiving an ignition signal from the ignition switch, the driver controls the electrical machine to operate as a motor so that the electrical machine rotates in a reverse direction to move the piston in a reverse stroke cycle. After the piston reverses to a power stroke position of the reverse stroke cycle the driver controls electrical machine to rotate in a forward direction to move the piston in a forward stroke cycle to attempt to ignite the combustion engine.

10 Claims, 5 Drawing Sheets

FOUR STROKE SINGLE CYLINDER COMBUSTION ENGINE STARTING SYSTEM

BACKGROUND OF THE INVENTION

The present invention relates to a four stroke single cylinder combustion engine starting system. The invention is particularly useful for, but not necessarily limited to, starting systems with relatively small starter motors typically used on low cost vehicles such as motorcycles and the like.

Starting systems for combustion engines used in vehicles and the like typically have a relatively large direct current starter motor coupled to a crank shaft. Conventional starting systems have an ignition switch that controls a solenoid that selectively electrically connects the starter motor to a heavy duty battery. When the engine is required to be started, a user actuates the ignition switch to energize the solenoid thereby connecting the starter motor to the battery. As a result, the starter motor rotates the crank shaft which in turn moves one or more pistons in respective cylinders of the engine to thereby attempt to start the engine.

When considering single cylinder engine starting systems that are often used in low end motorcycles such as mopeds, relatively expensive starting systems with starter motors are reluctantly used and are sometimes replaced with a kick-starting device. The reason for the expense of starting systems with starter motors is because a relatively large torque is usually required to start the engine. To provide this large torque, a relatively large starter motor and large heavy duty battery are required for conventional combustion engine starting systems.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
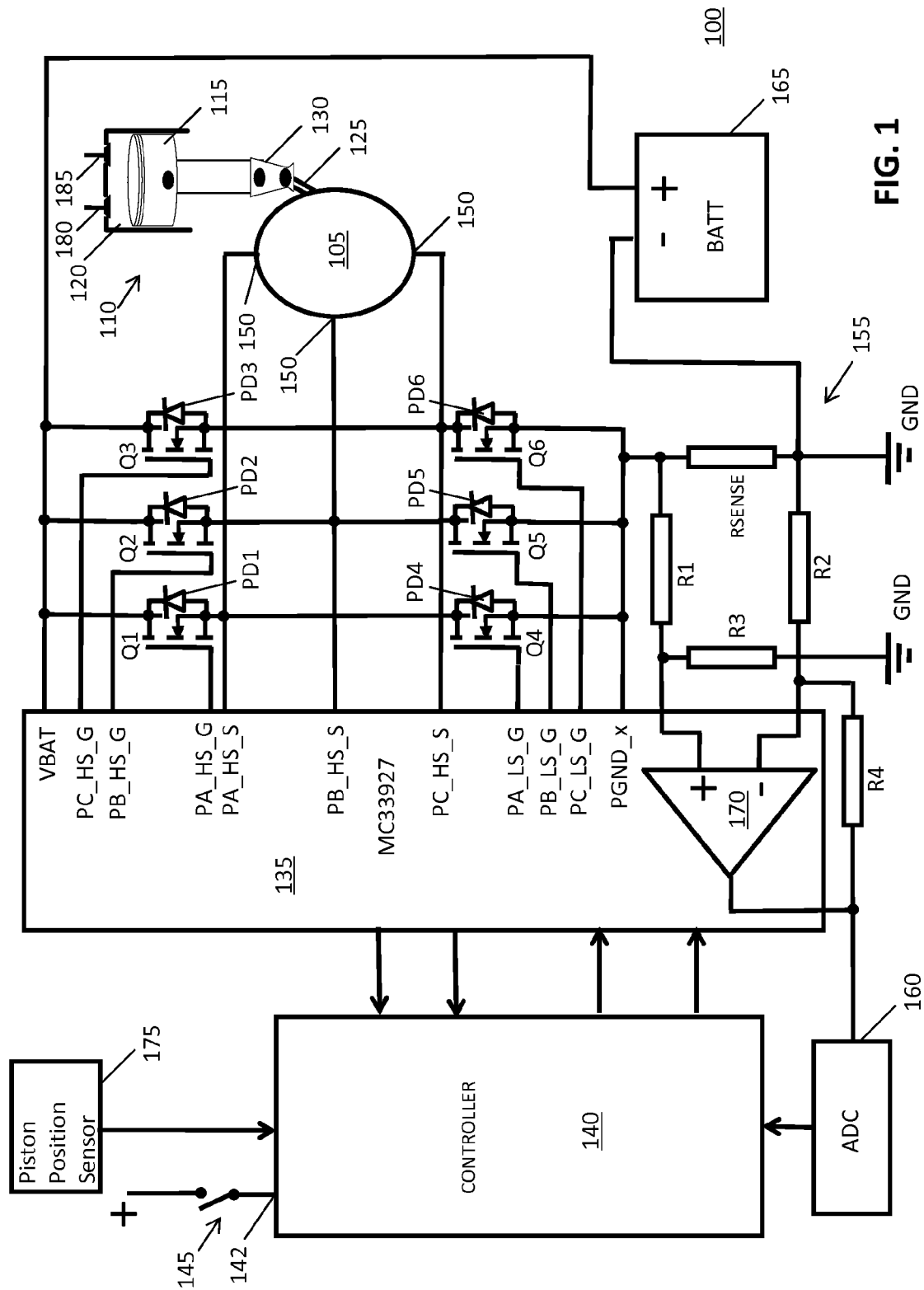
FIG. 1 is a schematic circuit diagram of an embodiment of a four stroke single cylinder combustion engine starting system.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that device components and method steps that comprises a list of elements or steps does not include only those elements but may include other elements or steps not expressly listed or inherent to such device components or steps. An element or step proceeded by "comprises . . . a" does not, without more constraints, preclude the existence of additional identical elements or steps that comprise the element or step.

In one embodiment, the present invention provides for a four stroke single cylinder combustion engine starting system comprising an electrical machine operable as both a generator and a motor. There is a single cylinder four stroke combustion engine having a piston disposed in a chamber, wherein the piston is coupled to a shaft of the electrical machine. The starting system also has a motor driver having outputs coupled to the electrical machine. There is a controller coupled to the driver and an ignition switch coupled to the controller.

In operation, in response to the controller receiving an ignition signal from the ignition switch, the driver controls the electrical machine to operate as a motor so that the electrical machine rotates in a reverse direction thereby moving the piston in a reverse stroke cycle. After the piston reverses to a power stroke position of the reverse stroke cycle the driver controls electrical machine to rotate in a forward direction thereby moving the piston in a forward stroke cycle to attempt to start the combustion engine.

In another embodiment, the present invention provides for a four stroke single cylinder combustion engine starting system comprising a motor and a single cylinder four stroke combustion engine having a piston disposed in a chamber, wherein the piston is coupled to a shaft of the motor. The starting system also has a controller coupled to the driver and there is an ignition switch coupled to the controller.

In operation, in response to the controller receiving an ignition signal from the ignition switch, the driver controls the motor to rotate in a reverse direction thereby moving the piston in a reverse stroke cycle. After the piston reverses to a power stroke position of the reverse stroke cycle the driver controls the motor to rotate in a forward direction thereby moving the piston in a forward stroke cycle to attempt to start the combustion engine.

An embodiment of the present invention will now be discussed with reference to FIG. 1. In this embodiment, there is illustrated a schematic circuit diagram of a four stroke single cylinder combustion engine starting system 100. The starting system 100 has an electrical machine 105 operable as both a generator and motor and in this specific example the electrical machine 105 is operable as an alternator and a brushless direct current motor. There is a single cylinder four stroke combustion engine 110 having a piston 115 disposed in a chamber 120. The piston 115 is coupled to a rotatable shaft 125 of the electrical machine 105 via a crankshaft 130 as will be apparent to a person skilled in the art.

The starting system 100 includes a motor driver which in this embodiment is a brushless direct current motor driver 135 having three outputs (PA_HS_S, PB_HS_S, PC_HS_S), coupled to terminals 150 of the electrical machine 105. As shown, the brushless direct current motor driver 135 is a MC33927 driver manufactured by Freescale Inc., however other brushless direct current motor driver drivers can be used and the type of motor driver will also vary depending on the type of electrical machine 105. For example, the electrical machine could be a brushless direct current motor (as used in this illustration), a permanent magnet motor (synchronous or otherwise) or an alternating current induction motor The brushless direct current motor driver 135 has associated power transistors Q1 to Q6 selectively coupling supply (VBAT) and ground (PGND_x) inputs to the three outputs (PA_HS_S, PB_HS_S, PC_HS_S. Also, gates of the power transistors Q1 to Q6 are coupled respectively to gate control outputs (PA_HS_G, PB_HS_G, PC_HS_G, PA_LS_G, PB_LS_G, PC_LS_G) of the brushless direct current motor driver 135.

There is a controller 140 coupled to the brushless direct current motor driver 135 and an ignition switch 145 is coupled to the controller 140 at an ignition signal input 142. The controller 140 typically includes a processor and can be used to control fuel injection and the firing angle of the single cylinder four stroke combustion engine 110. The starting system 100 in this embodiment also includes an engine stroke cycle sensor 155 having an output coupled to the controller 140 via an Analogue to Digital Converter (ADC) 160. The engine stroke cycle sensor 155 includes a low resistance resistor RSENSE coupling the terminals 150 of the electrical machine via transistors Q4, Q5, Q6 to a ground reference node GND that is connected to a negative electrode of a battery 165. The low resistance resistor RSENSE is coupled across inputs of an operational amplifier 170 incorporated in the brushless direct current motor driver 135. More specifically, one side of the low resistance resistor RSENSE is coupled through a resistor R1 to a non-inverting input of the operational amplifier 170 and the other side of the resistor RSENSE (that is connected to the ground reference node GND) is coupled through a resistor R2 to an inverting input of the operational amplifier 170. Also, a resistor R3 couples the non-inverting input of the operational amplifier 170 to the ground reference node GND and a feedback resistor R4 couples the output of the operational amplifier 170 to its inverting input. Although in this embodiment motor current is used to sense engine stroke, other methods such as cam position sensing, crank speed or manifold pressure might be used as known to those skilled in the art.

The starting system 100 further includes a piston position sensor 175 coupled to the controller 140. The piston position sensor 175 is typically a Hall Effect sensor or variable reluctance sensor that can identify the angular position of the crankshaft and thus the cyclical position of the piston 115 as will be apparent to a person skilled in the art.

In operation, in response to the controller 140 receiving an ignition signal IS from the ignition switch 145, the brushless direct current motor driver 135 controls the electrical machine 105 to operate as a motor (specifically in this embodiment the electrical machine 105 operates a brushless direct current motor). The ignition signal IS in this embodiment is a positive supply voltage provided by the positive electrode of the battery 165 to the ignition signal input 142. As a result of the ignition signal IS being provided to the ignition signal input 142, the electrical machine 105 rotates in a reverse direction thereby moving the piston 115 in a reverse stroke cycle. After the piston 115 reverses to a power stroke position of the reverse stroke cycle, the brushless direct current motor driver 135 controls the electrical machine 105 to rotate in a forward direction thereby moving the piston 115 in a forward stroke cycle to thereby attempt to start the single cylinder four stroke combustion engine 110.

The stroke cycle sensor 155 provides a stroke cycle signal S1 (digitized by the ADC 160) to the controller 140 that is indicative of the combustion engine being in a power stroke position. The stroke cycle signal S1 is dependent on current flowing from the brushless direct current motor driver 135 and into the electrical machine 105. When the piston 115 reverses to the power stroke position of the reverse stroke cycle, the current flowing through the electrical machine 105 increases since valves 180, 185 are both closed and therefore the piston 115 is compressing gas in the chamber 120. Consequently, current in the resistor RSENSE increases to provide the stroke cycle signal S1.

Typically, the stroke cycle signal S1 cannot accurately determine the actual angular position of the piston 115 as current flowing through the electrical machine 105, during the power stroke position of the piston 115, can vary with the temperature of the combustion engine 110. Hence, the piston position sensor 175 provides a piston position signal S2 indicative of an angular position of the piston 115. Typically, in operation the piston 115 reverses until it is less than 20 degrees from top dead centre as indicated by the piston position signal S2 provided by the piston position sensor 175.

After starting of the combustion engine 110, the electrical machine 105 operates as a generator (more specifically an alternator). Accordingly, the electrical machine 105 is selectively coupled to the battery 165 through a rectifier. As illustrated, the negative electrode of the battery 165 is coupled through the resistor RSENSE to the ground (PGND_x) input and a positive electrode of the battery 165 is coupled to the supply (VBAT). In this configuration, the power transistors Q1 to Q6 are controlled by the controller 140 and the brushless direct current motor driver 135 to operate as an active rectifier when the electrical machine 105 operates as an alternator. More specifically, the power transistors Q1 to Q6 are selectively switched on to conduct in a synchronized manner with alternating currents flowing from each of the three terminals 150 of the electrical machine 105, therefore the power transistors Q1 to Q6 essentially function as diodes when the electrical machine 105 operates as an alternator.

In another embodiment the stroke cycle sensor 155 and piston position sensor 175 may not be required when moving the piston 115 in the reverse stroke cycle. Instead, a timer, typically located in the controller 140, may be used. The timer is activated when the controller 140 receives the ignition signal IS. This results in the brushless direct current motor driver 135 controlling the electrical machine 105 to operate as a brushless direct current motor so that the electrical machine 105 is controlled to rotate in the reverse direction for a pre-determined time period. This pre-determined time period is selected to be sufficient to allow the electrical machine 105 to attempt to reverse the piston 115 to the power stroke position of the reverse stroke cycle. If the piston 115 reaches the power stroke position before the expiration of the pre-determined time period then the brushless direct current motor driver 135 is programmed to limit the current supplied to the electrical machine 105 so that it stalls. However, the brushless direct current motor driver 135 is programmed to provide a larger current when the electrical machine 105 rotates in the forward direction so that it doesn't stall when reaching top dead centre of the compression cycle.

As one alternative to the use of active rectification, the physical construction of the power transistors Q1 to Q6 (which are MOSFETs) results in respective parasitic diodes PD1 to PD6. With the suitable fabrication and design of the power transistors Q1 to Q6, their parasitic diodes PD1 to PD6 can be used as a passive rectifier when the electrical machine 105 operates as an alternator.

Figure 2:
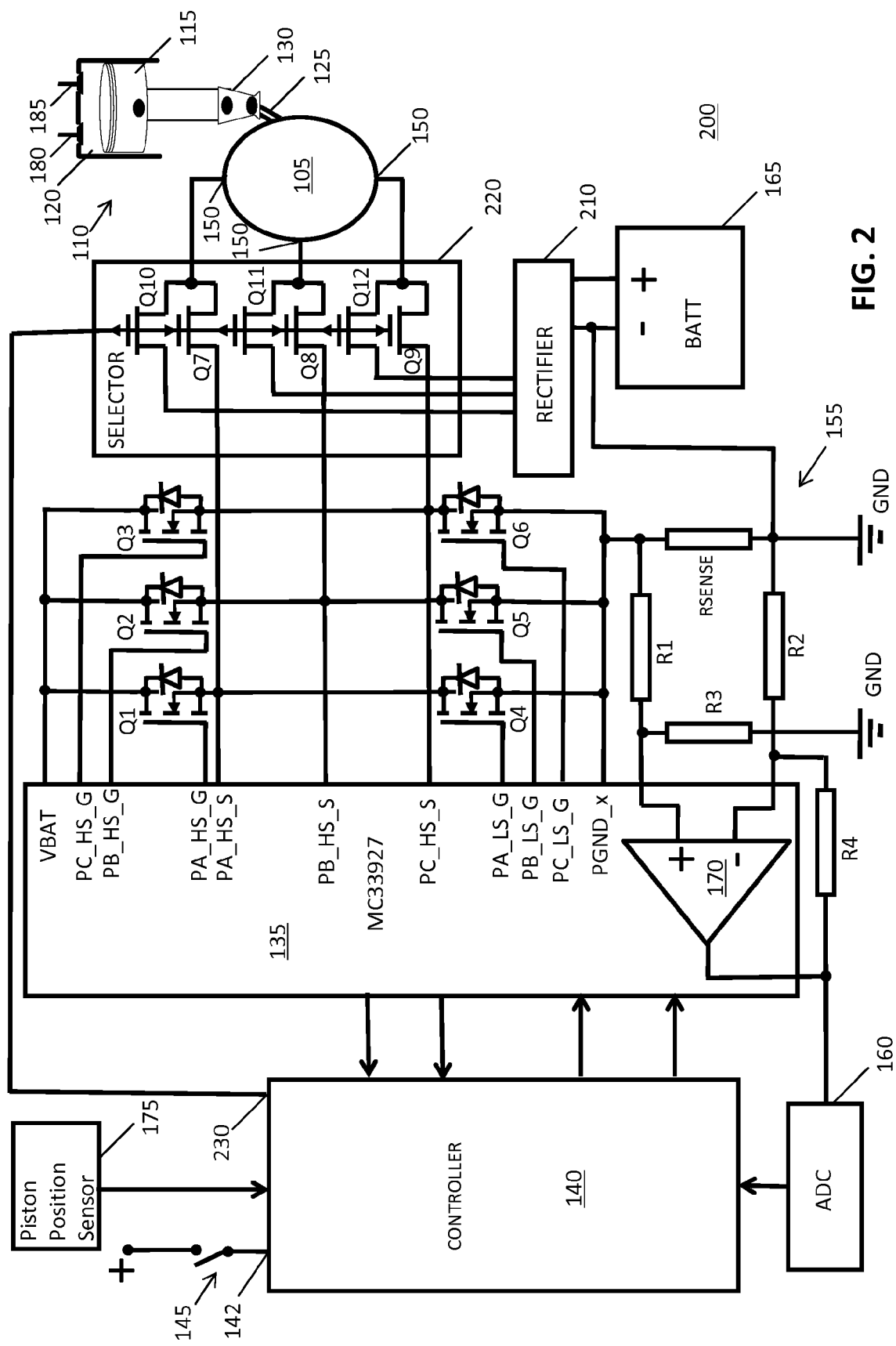
FIG. 2 is a schematic circuit diagram of another embodiment of a four stroke single cylinder combustion engine starting system.

Referring to FIG. 2, there is illustrated a schematic circuit diagram of another embodiment of a four stroke single cylinder combustion engine ignition system 200. As most of the circuitry has been described above with reference to FIG. 1, a repetitive description of this circuitry is not required for one of skill in the art to understand the invention and only the differences will be described. In this embodiment, a passive dedicated rectifier 210 is included instead of using the power transistors Q1 to Q6 as active rectifiers when electrical machine 105 operates as an alternator. There is also a selector 220 inserted between the three outputs (PA_HS_S, PB_HS_S, PC_HS_S) of the brushless direct current motor driver 135 and terminals 150 of the electrical machine 105. The selector has three N type transistors Q7, Q8, Q9 and three complementary P type transistors Q10, Q11, Q12. Gates of all the transistors Q7 to Q12 are connected to a common control line coupled to an output 230 of the controller 140.

In operation, the three N type transistors Q7,Q8,Q9 provide for selectively coupling the three outputs (PA_HS_S, PB_HS_S, PC_HS_S) to the terminals 150. Specifically, the three N type transistors Q7, Q8, Q9 conduct and the three complementary P type transistors Q10, Q11, Q12 are non-conductive when the brushless direct current motor driver 135 controls the electrical machine 105 to operate as a brushless direct current motor. Conversely, the three N type transistors Q7, Q8, Q9 are non-conductive and the three complementary P type transistors Q10, Q11, Q12 are conductive when the electrical machine 105 operates as an alternator. When the three complementary P type transistors Q10, Q11, Q12 are conductive, alternating current provided from the electrical machine 105 is converted (rectified by the rectifier 210) to direct current for charging the battery 165.

Figure 3:
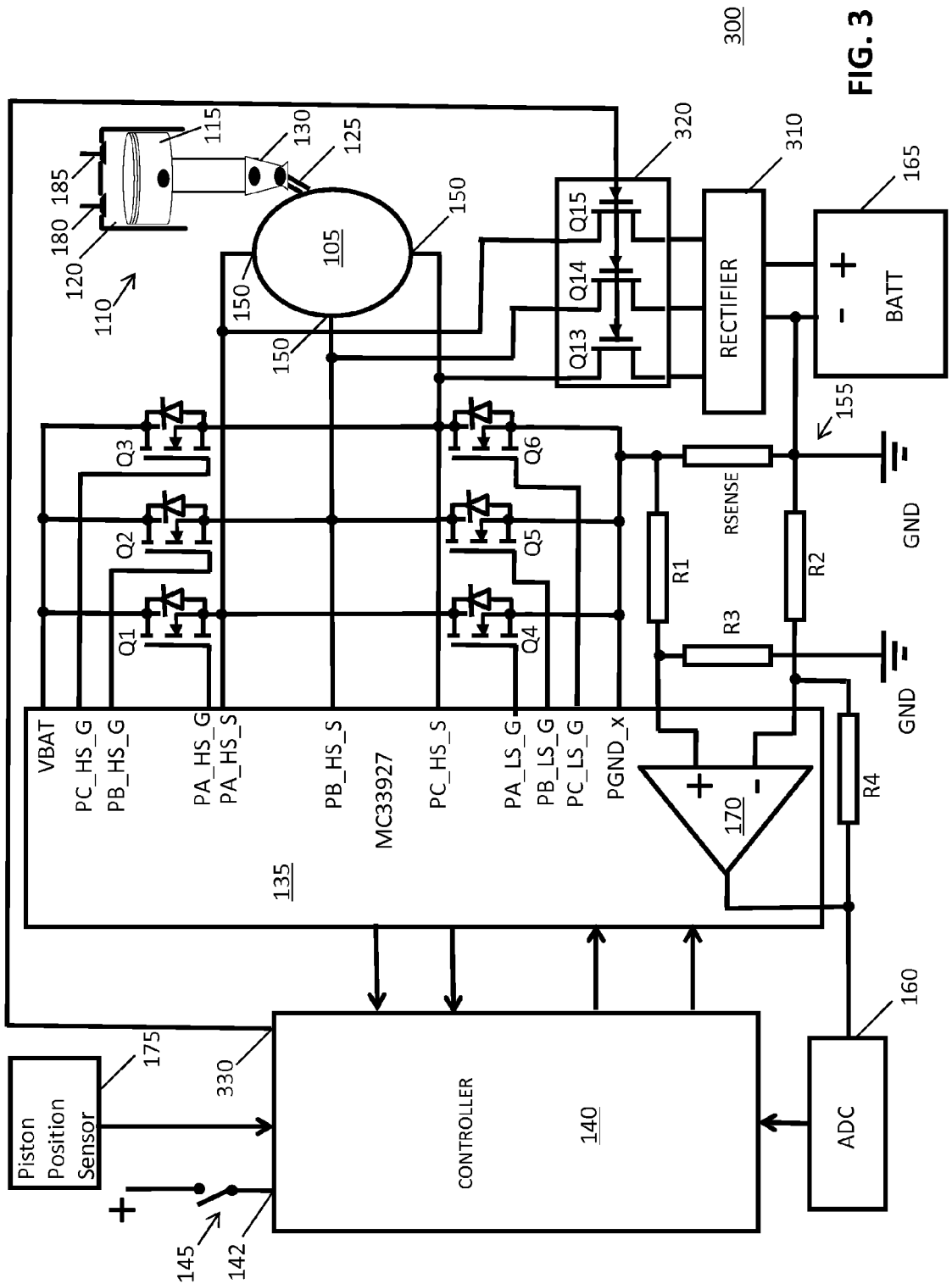
FIG. 3 is a schematic circuit diagram of a further embodiment of a four stroke single cylinder combustion engine starting system.

Referring to FIG. 3, there is illustrated a schematic circuit diagram of a further embodiment of a four stroke single cylinder combustion engine ignition system 300. As most of the circuitry has been described above with reference to FIG. 1, a repetitive description of this circuitry is not required for one of skill in the art to understand the invention and only the differences will be described. In this embodiment, a passive dedicated rectifier 310 is included. There is also an isolator 320 comprising three N type transistors Q13, Q14, Q15 with their gates connected to a common control line that is coupled to an output 330 of the controller 140. The isolator 220 provides for selectively coupling the passive dedicated rectifier 310 to the terminals 150 of the electrical machine 105 and thus selectively coupling the electrical machine 105 to the battery 165 through the rectifier 310.

In operation, the three N type transistors Q13, Q14, Q15 are non-conductive and isolate the three outputs (PA_HS_S, PB_HS_S, PC_HS_S) from the rectifier 310 when the brushless direct current motor driver 135 controls the electrical machine 105 to operate as a brushless direct current motor. However, when the electrical machine 105 operates as an alternator, the three N type transistors Q13, Q14, Q15 are conductive thereby current provided from the electrical machine 105 is converted (rectified by the rectifier 310) to direct current for charging the battery 165. In this condition, it will be apparent to one skilled in the art that when the electrical machine 105 operates as an alternator no current is drawn by the three outputs (PA_HS_S, PA_HS_S, PC_HS_S) of the brushless direct current motor driver 135.

In yet another embodiment of the present invention the electrical machine 105 may be a dedicated starter motor that only operates as a motor. Accordingly, in such an embodiment there would be a separate dedicated generator (alternator or dynamo) as will be apparent to one skilled in the art. The dedicated starter motor might operate in the forward direction only, or be reversible in order to rotate the engine in the reverse direction. The alternator might be a charger only, or might be used as a motor device in conjunction with the starter motor.

Figure 4:
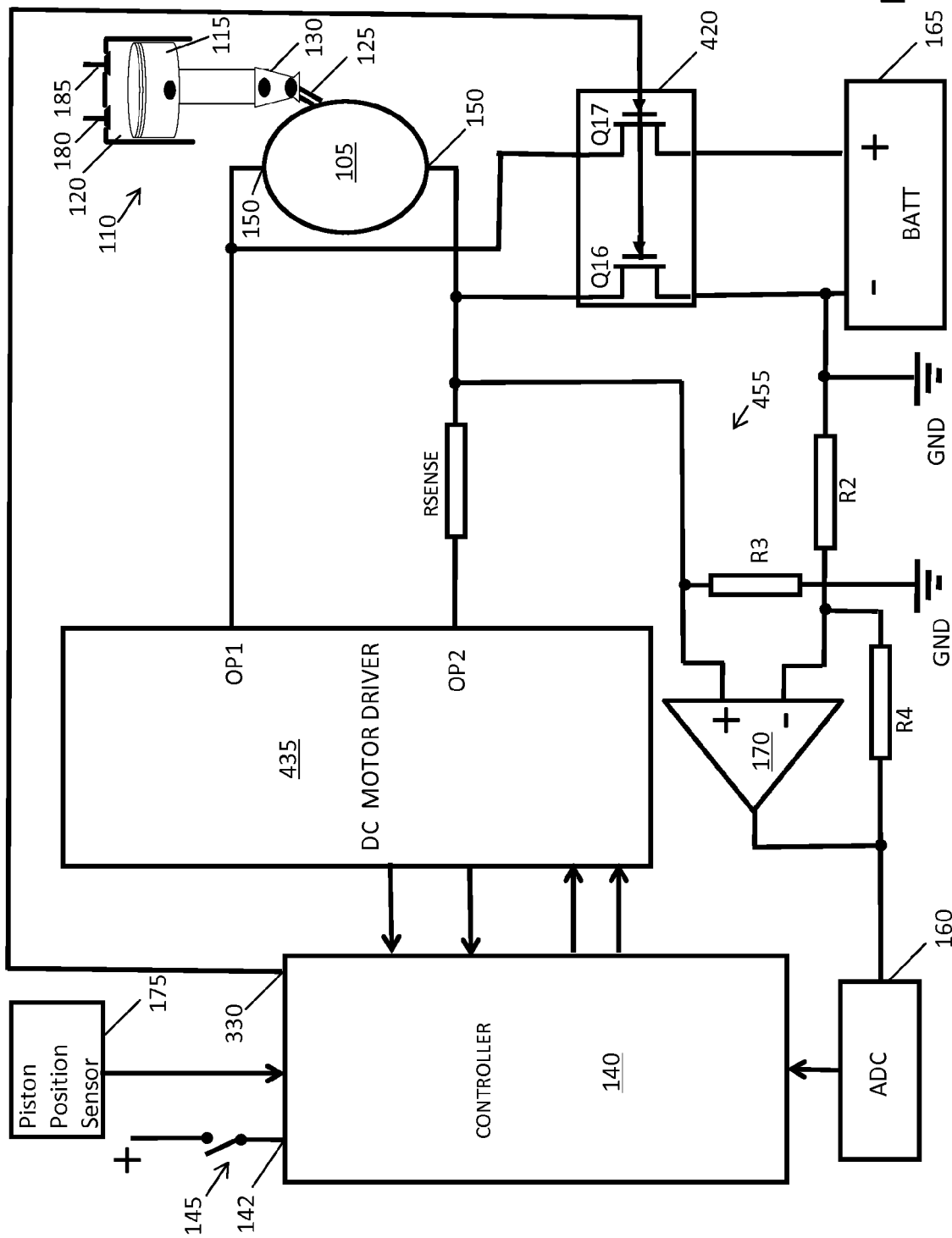
FIG. 4 is a schematic circuit diagram of another embodiment of a four stroke single cylinder combustion engine starting system.

Referring to FIG. 4, there is illustrated a schematic circuit diagram of another embodiment of a four stroke single cylinder combustion engine ignition system 400. As most of the circuitry has been described above with reference to FIG. 1, a repetitive description of this circuitry is not required for one of skill in the art to understand the invention and only the differences will be described. In this embodiment, the driver 135 has been replaced with a direct current motor driver 435 with outputs OP1 and OP2 coupled to the terminals 150 of the electrical machine 105 which is a direct current motor. There is an engine stroke cycle sensor 455 that includes a low resistance resistor RSENSE and the operational amplifier 170 which in this embodiment is not included as part of the direct current motor driver 435. There is also an isolator 420 comprising two N type transistors Q16, Q17 with their gates connected to a common control line that is coupled to an output 330 of the controller 140. The isolator 420 provides for selectively coupling the battery 165 to the terminals 150 of the electrical machine 105.

In operation, the two N type transistors Q16, Q17 are non-conductive and isolate the outputs OP1, OP2 of the direct current motor driver 435 when the direct current motor driver 435 when they provide direct current to the electrical machine. However, when the electrical machine 105 operates as a generator (more specifically an alternator), the two N type transistors Q16, Q17 are conductive thereby current provided from the electrical machine 105 charges the battery 165. In this condition, it will be apparent to one skilled in the art that when the electrical machine 105 operates as a generator no current is drawn by the outputs OP1, OP2 of the direct current motor driver 435.

In yet another embodiment of the present invention the electrical machine 105 may be a dedicated direct current starter motor coupled to the direct current motor controller 435. The electrical machine 105 would therefore only operate as a starter motor and there would be no need for the isolator 420, however, a separate generator would be required.

Figure 5:
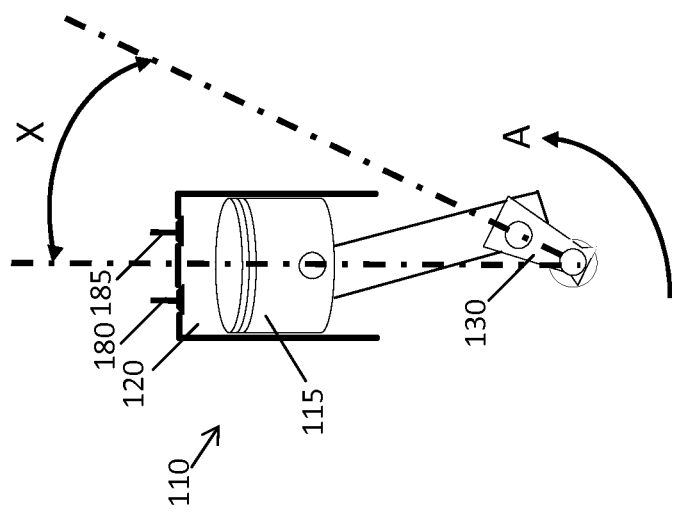
FIG. 5 illustrates the single cylinder four stroke combustion engine with a piston moving in a reverse stroke cycle.

Referring to FIG. 5 there is illustrated the single cylinder four stroke combustion engine 110 when the piston 115 is moving in the reverse stroke cycle. The reverse stroke cycle direction is indicated by arcuate arrow A. The piston 115 initially moves in the reverse stroke cycle direction and is driven by the electrical machine 105 when operating as a brushless direct current motor. This initial movement of the piston is in response to the controller 140 receiving the ignition signal IS from the ignition switch 145. The piston 115 moves to a power stroke position of the reverse stroke cycle and depending on the embodiment and calibration of the piston position sensor 175, the piston 115 reverses until it is less than 20 degrees from top dead centre as illustrated by angle X. The angular rotation required for the piston 115 to reverse until it is less than 20 degrees from top dead centre is dependent on its starting position. This starting position may vary considerably especially if the single cylinder four stroke combustion engine 110 drives a motor cycle since the motor cycle may be moved whilst in gear. Accordingly, the maximum angular rotation required for the piston 115 to reverse until it is less than 20 degrees from top dead centre of a power stroke can be up to 700 degrees. Such a large angular rotation would be required if the starting position is at top dead centre of a power stroke cycle. Consequently, the piston 115 would need to reverse 180 degrees through a compression stroke cycle then 180 degrees through an intake stroke cycle then another 180 degrees through an exhaust stroke cycle and the at least 160 degrees reversal into another power stroke.

When in the power stroke cycle the piston 115 compresses gas in the chamber 120 since both valves 180, 185 are closed.

The gas that is compressed may advantageously provide an initial spring assistance when the piston 115 is driven (moved) by the electrical machine 105 to rotate in the forward direction.

Figure 6:
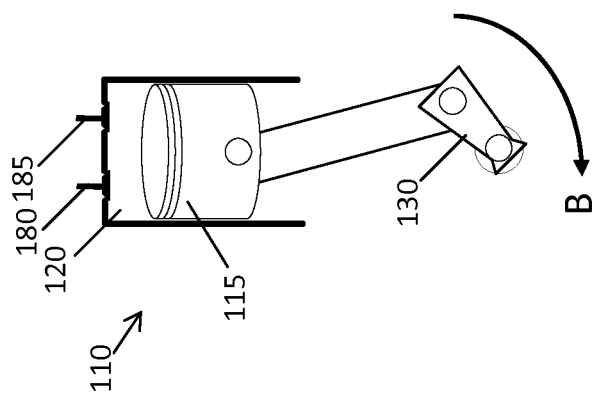
FIG. 6 illustrates the single cylinder four stroke combustion engine when the piston is moving in a forward stroke cycle immediately after completion of the reverse stroke cycle.

Referring to FIG. 6, there is illustrated the single cylinder four stroke combustion engine 110 when the piston 115 is moving in the forward stroke cycle immediately after completion of the reverse stroke cycle. The forward stroke cycle direction is indicated by arcuate arrow B and as shown the piston 115 is in piston is in the power stroke cycle as both valves 180, 185 are closed. The piston 115 then moves into an exhaust stroke cycle in which valve 185 is open (the exhaust valve) and therefore the angular velocity of the piston 115 driven by the electrical machine 105 increases. The piston 115 next moves into an intake stroke cycle in which valve 180 is open (the intake valve) and therefore the angular velocity of the piston 115 continues to increase. The piston 115 next moves into a compression stroke cycle in which both valves valve 180 are closed and therefore the angular velocity of the piston 115 decreases as gas (comprising fuel vapor and air) is compressed in the chamber 120. When top dead centre is reached, the piston 115 would have been gaining angular velocity for approximately 520 to 540 degrees of angular rotation and the angular velocity would have decreased slightly for approximately 180 degrees of angular rotation during the compression stroke cycle.

At approximately top dead centre the combustion engine 110 ideally ignites, otherwise the above forward stroke cycles are repeated. In most embodiments, once the combustion engine 110 is ignited the electrical machine 105 operates an alternator driven by the combustion engine 110.

As is evident from the foregoing discussion, the present invention advantageously provides for a relatively low cost four stroke single cylinder combustion engine starting system. This is because the torque required to "turn over" the combustion engine 110 by the electrical machine 105 can be created over the maximum angular rotation allowable by the configuration of the combustion engine 110. Thus, when top dead centre is reached, the piston 115 would have been gaining angular velocity for approximately 520 to 540 degrees of angular rotation and the angular velocity would have decreased slightly for approximately 180 degrees of angular rotation during the compression stroke cycle. Accordingly, less current is required by the electrical machine 105 when operating as a brushless direct current motor in order to "turn over" the combustion engine 110. This also leads to a requirement of a smaller battery and therefore the overall cost of the starting system 100 of the present invention is less than conventional starting systems.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A four stroke single cylinder combustion engine starting system, comprising:
   an electrical machine operable as both a generator and a motor;
   a single cylinder four stroke combustion engine having a piston disposed in a chamber, wherein the piston is coupled to a shaft of the electrical machine;
   a motor driver having outputs coupled to the electrical machine;
   a controller coupled to the driver;
   an ignition switch coupled to the controller; and
   an engine stoke cycle sensor having an output coupled to the controller;
   wherein, in operation, in response to the controller receiving an ignition signal from the ignition switch, the motor driver controls the electrical machine to operate as a motor so that the electrical machine rotates in a reverse direction thereby moving the piston in a reverse stroke cycle, and wherein after the piston reverses to a power stroke position of the reverse stroke cycle, the engine stroke cycle sensor provides a stroke signal to the controller that is dependent on current flowing from the motor driver and into the electrical machine, and is indicative of the combustion engine being in the power stoke position, the motor driver controls electrical machine to rotate in a forward direction thereby moving the piston in a forward stroke cycle to start the combustion engine, wherein after starting the combustion engine, the electrical machine operates as a generator and is selectively coupled to a battery by way of a rectifier.

2. The four stroke single cylinder combustion engine starting system of claim 1, wherein the stroke cycle sensor includes a low resistance resistor coupling the electrical machine to a reference node.

3. The four stroke single cylinder combustion engine starting system of claim 1, wherein the motor driver is a brushless direct current motor driver and the electrical machine is operable as a brushless direct current motor.

4. The four stroke single cylinder combustion engine starting system of claim 1, further including a piston position sensor coupled to the controller, wherein in operation the piston position sensor provides a piston position signal indicative of an angular position of the piston.

5. The four stroke single cylinder combustion engine starting system of claim 4, wherein in operation the piston reverses until it is less than 20 degrees from top dead centre.

6. The four stroke single cylinder combustion engine starting system of claim 5, wherein the piston position signal indicates when the piston is less than 20 degrees from top dead centre.

7. The four stroke single cylinder combustion engine starting system of claim 4, wherein in operation the piston reverses until it compresses gas in the chamber.

8. The four stroke single cylinder combustion engine starting system of claim 1, wherein the rectifier is an active rectifier.

9. The four stroke single cylinder combustion engine ignition system of claim 1, wherein the battery is selectively coupled through the rectifier and to the electrical machine when operating as an alternator.

10. The four stroke single cylinder combustion engine ignition system of claim 1, wherein the driver controls the electrical machine to operate as a brushless direct current motor so that the electrical machine is controlled to rotate in the reverse direction for a pre-determined time period.

* * * * *